July 19, 1949.     S. L. BRADLEY     2,476,805
REGULATING SYSTEM FOR SYNCHRONOUS CONDENSERS
Filed May 22, 1948

WITNESSES:
Robert C. Baird
Leon M. Garman

INVENTOR
Schuyler LeRoy Bradley.
BY
James N. Ely
ATTORNEY

Patented July 19, 1949

2,476,805

UNITED STATES PATENT OFFICE 2,476,805

REGULATING SYSTEM FOR SYNCHRONOUS CONDENSERS

Schuyler L. Bradley, Pittsburgh, Pa., assignor to Westinghouse Electric Corporation, East Pittsburgh, Pa., a corporation of Pennsylvania Application May 22, 1948, Serial No. 28,551

6 Claims. (Cl. 323—117)

This invention relates to regulating systems and in particular to regulating systems having current limiting characteristics.

An object of this invention is to provide a regulating system for a synchronous condenser connected to a load circuit, the regulating system embodying a static circuit for effecting a quick change in the excitation of the synchronous condenser when the alternating current in the load circuit reaches a predetermined value.

Another object of this invention is to provide, in a regulating system having a regulating exciter generator disposed for operation in response to a regulator to control the excitation of a synchronous condenser connected to a load circuit, for controlling the operation of the regulating generator when the alternating current in the load circuit reaches a predetermined value to provide current limiting protection for the synchronous condenser.

Figure 1:
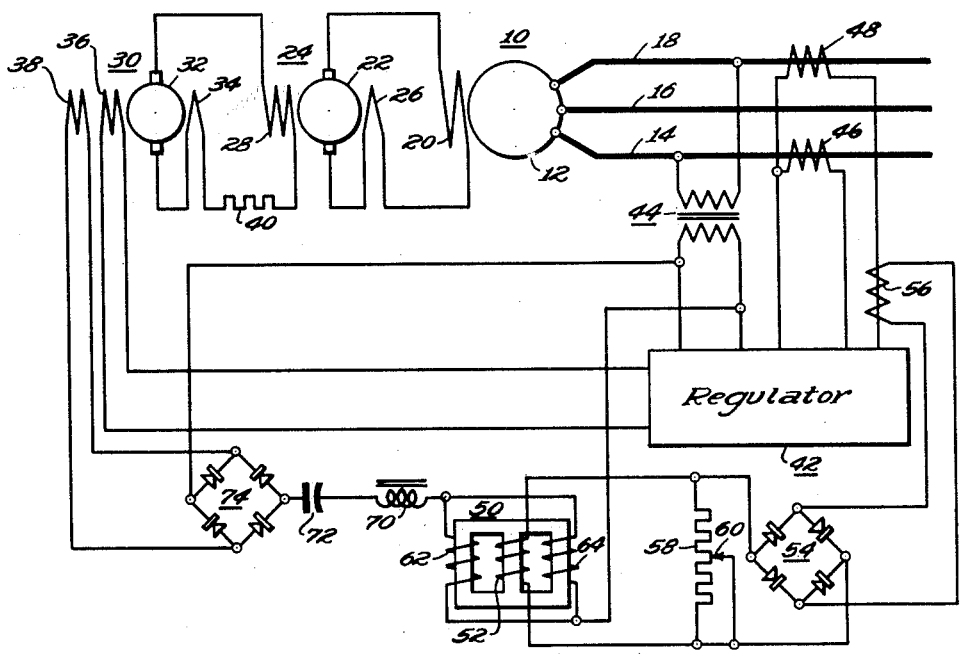
Figure 2:
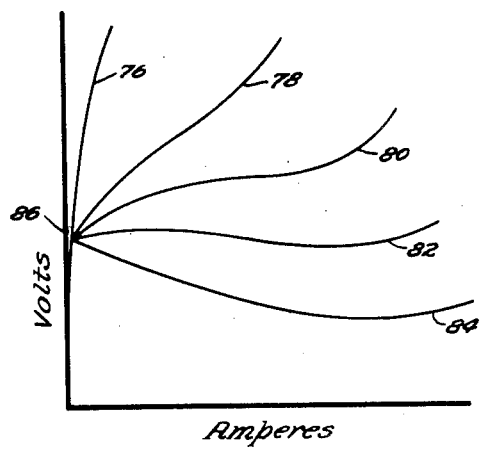

Other objects of this invention will become apparent from the following description when taken in conjunction with the accompanying drawing, in which:

Figure 1 is a diagrammatic representation of a regulating system embodying the teachings of this invention, and Fig. 2 is a graph, the curves of which represent the impedance characteristics of certain parts of the system shown in Fig. 1.

Referring to Figure 1 of the drawing, this invention is illustrated by reference to a regulating system for a synchronous condenser 10 having armature windings 12 connected to load conductors 14, 16 and 18. The synchronous condenser is provided with field windings 20 connected across the armature windings 22 of a pilot exciter 24 provided with a series field winding 26 and a separate field winding 28. In this instance the field windings 28 are connected to be energized in response to the operation of a regulating exciter generator 30.

The regulating generator 30 is of the self-energizing or "series-tuned" type which normally operates along the linear part of its saturation curve. The regulating generator 30 is provided with armature windings 32, a self-energizing field winding 34 and two control field windings 36 and 38. As illustrated, one terminal of the field winding 28 of the exciter 24 is connected through a resistor 40 and the self-energizing field winding 34 to one side of the armature windings 32 of the regulating generator 30, the other terminal being connected to the other side of the armature winding 32. The series field winding 34 is employed for normally supplying the excitation requirements of the exciter 30.

The control field winding 36 is disposed to be directionally energized to either aid or oppose the excitation effect of the self-energizing series field winding 34 in response to a change in the electrical conditions across load conductors 14, 16 and 18. Thus, the control field winding 36 is connected through a voltage regulator, represented schematically by the block 42, and potential transformer 44 and current transformers 46 and 48 to be energized in accordance with an electrical condition of the load conductors 14, 16 and 18. Any suitable regulator 42 may be employed, reference being had to the voltage reference network disclosed and claimed in Patent No. 2,428,556, issued October 7, 1947 to E. L. Harder, et al. as suitable for this purpose.

In accordance with this invention, the control field winding 38 is disposed to be energized in one direction only, in response to a predetermined flow of alternating current in the load conductors. In order to obtain such results, a three-legged saturable core reactor 50 is employed for aiding the control of the energization of the field winding 38.

The saturable core reactor 50 is provided with a direct current control winding 52 disposed on the center leg of the core member and connected to be energized in accordance with the flow of current in the load conductors. Thus the winding 52 is connected across the output terminals of a full wave dry-type rectifier 54, the input terminals of which are connected across a current transformer 56 disposed in inductive relation with a lead conductor of the current transformer 48. In order to control the degree of energization of the direct current control winding 52, an adjustable resistor 58 is connected in parallel circuit relation with the control winding 52. The setting of the adjustable tap 60 of the resistor 58 determines the maximum current permitted to flow in the load conductors 14, 16 and 18 as will be better understood from the description given hereinafter.

The saturable core reactor 50 is also provided with a pair of alternating current windings 62 and 64 disposed on the outer legs thereof and connected in parallel circuit relation with one another to be supplied from a suitable source of alternating current voltage. In this instance the parallel connected windings 62 and 64 are connected in a circuit to be supplied from the secondary winding of the potential transformer 44, it being found that such supply is maintained at a substantially constant value by reason of the normal operation of the regulator 42.

As illustrated, a saturating reactor circuit is also connected in series with the parallel connected alternating current windings 62 and 64 of the reactor 50 to be supplied from the transformer 44 for cooperating in controlling the current flow in the control field winding 38 of the regulating generator 30. This circuit comprises a saturating reactor 70, a capacitor 72 and a dry-type full wave rectifier 74 connected in series circuit with one another and with the parallel connected windings 62 and 64 of the saturable reactor 50 whereby current flows through the circuit dependent upon the impedance characteristics of the alternating current circuit and the energization of the control winding 52 of the reactor 50. As the control field winding 38 is connected across the output terminals of the rectifier 74, the current flow in the alternating current winding circuit of the reactor 50 including the saturating reactor circuit as described determines the energization of the control field winding 38.

The alternating current winding circuit comprising the parallel connected windings 62 and 64 and the series connected saturating reactor circuit is so designed as by properly selecting the saturating reactor 70 and capacitor 72 as to have impedance characteristics as illustrated in Fig. 2 depending upon the flow of current in the direct current control winding 52. Thus as the current in the control winding 52 increases, the impedance of the alternating current circuit varies depending upon the alternating current voltage impressed on the alternating current circuit, giving a family of curves represented by curves 76, 78, 80, 82 and 84. By properly selecting an alternating current voltage as represented at point 86 to be impressed on the alternating current winding circuit, it is evident that as the control current in winding 52 increases to a predetermined value the impedance characteristics of the alternating current circuit are such that for the given impressed alternating current voltage very little, if any, alternating current will flow in the alternating current winding circuit. However, when the predetermined value of current in the control windings 52 is reached, then, as represented by the curve 82 for a given impressed alternating current voltage 86, a very fast increase in the flow of alternating current in the alternating current winding circuit is obtained, which when rectified by the rectifier 74 provides a fast energization of the control field winding 38 in the one direction.

However, as will be understood by those skilled in the art, the voltage applied to the alternating current winding circuit from the transformer 44 will not be constant but will vary somewhat depending upon load conditions and the operation of the regulator 42 and the energization of the control field winding 38. Thus the point 86 of Fig. 2 will vary somewhat but in all cases a similar family of curves will be obtained.

In operation, with the synchronous condenser 10 connected to the load conductors 14, 16 and 18 as illustrated and with a given load being supplied under normal conditions, then the excitation of the synchronous condenser 10 is at a normal value with the regulating exciter generator 30 being operated to maintain such normal excitation. If for any reason the load changes so as to effect a decrease in the voltage across the load conductors 14, 16 and 18, the regulator 42 operates in a well known manner as described in Patent No. 2,428,566 referred to hereinbefore in response to the positive sequence component of the voltage across the load conductors to effect the energization of the control field winding 36 in a direction to aid the excitation effect of the self-energizing field winding 34 of the regulating exciter generator 30 and thereby increase its output with the result that the excitation of the exciter 24 is increased. Under such conditions, the increase in current flow through the field winding 20 of the synchronous condenser 10 effectively increases the excitation of the synchronous condenser 10 to effectively increase the voltage across load conductors 14, 16 and 18 to the predetermined normal value which is to be maintained.

If the demand on the regulator 42 is such as has just been described but the resulting increase in the excitation of the synchronous condenser 10 is such as to cause current to flow in the load conductors 14, 16 and 18 of a value larger than a predetermined value, such as the rated value of the condenser 10, then the current supplied to the direct current control winding 52 of the saturable reactor 50 is increased until the impedance characteristics of the alternating current winding circuit follows along the curve 82 with the result that alternating current of increasing magnitude suddenly flows in the alternating current winding circuit whereby the rectifier 74 supplies unidirectional current to the control field winding 38. Such flow of current in the winding 38 produces an action in opposition to the action of the control field winding 36 to effect a reduction in the net excitation of the regulating exciter generator 30 and thereby effect a reduction in the excitation of the synchronous condenser 10.

Even though the regulator 42 continues to operate in response to the voltage across the load conductors 14, 16 and 18 to effect the energization of the control field winding 36, the current limiting circuit functions to effect the energization of the control field winding 38 in opposition thereto to produce an action which neutralizes the action of the control field winding 36. Such action of the current limiting circuit in controlling the energization of the control field winding effectively prevents an increase in the excitation of the synchronous condenser 10 to the degree where the synchronous condenser supplies current to the load circuit above a predetermined value.

The predetermined value of current in load conductors 14, 16 and 18 can be readily established by adjusting the tap 60 of resistor 58 to control the current flow in the direct current control winding 52 of reactor 50. Thus if it is desired to increase the predetermined value, the resistor 58 is adjusted whereby less current flows through the direct current control winding 52 so that a higher value of current must flow in the load conductors 14, 16 and 18 before the control winding 52 is energized sufficiently to produce the impedance characteristics corresponding to curve 82 and thereby cause the quick increase in the flow of current through the control field winding 38 as described hereinbefore.

If the change in the voltage across the load conductors 14, 16 and 18 is an increase from the value which is to be maintained, then the regulator 42 functions to energize the control field winding 36 in a direction to tend to oppose the excitation effect of the self-energizing field winding 34 to decrease the output of the exciter generator 30 and thereby decrease the excitation of the exciter 24. Under such conditions, the current flow through the field winding 20 is decreased to decrease the excitation of the synchronous condenser 10 and thereby return the voltage across conductors 14, 16 and 18 to the predetermined value which is to be maintained.

The system of this invention is very sensitive in operation, being effective to maintain regulation while providing current limiting protection to prevent overloading of the synchronous condenser. The system, being formed of static components, is quite stable during operation, gives a fast response and requires little maintenance.

I claim as my invention:

1. In a regulating system for a synchronous condenser connected to a load circuit, the combination comprising, a saturable core reactor having a direct current control winding disposed to be energized in accordance with the flow of current in the load conductors, an alternating current winding circuit for the saturable core reactor connected to be supplied from a source of alternating current voltage, the alternating current winding circuit including alternating current windings for the reactor and a series connected saturating reactor and capacitor and dry-type rectifier, and means connected to be supplied by the rectifier disposed to limit the excitation of the synchronous condenser to maintain the flow of current in the load circuit below a predetermined value, the alternating current winding circuit having impedance characteristics that for a predetermined alternating current voltage impressed on the alternating current winding circuit from said source there is substantially no current flow therein until the flow of current in the direct current control winding reaches a predetermined value after which a rapid increase in the flow of current in the alternating current winding circuit is effected to supply said limiting means.

2. In a regulating system for a synchronous condenser connected to a load circuit, the combination comprising, a saturable core reactor having a direct current control winding disposed thereon, means for supplying unidirectional current to the direct current control winding in accordance with the flow of current in the load conductors, means connected in circuit relation with the direct current control winding for adjusting the degree of energization thereof, an alternating current winding circuit for the saturable core reactor connected to be supplied from a source of alternating current voltage, the alternating current winding circuit including alternating current windings for the reactor and a series connected saturating reactor and capacitor and dry-type rectifier, and means connected to be supplied by the rectifier disposed to limit the excitation of the synchronous condenser to maintain the flow of current in the load circuit below a predetermined value, the alternating current winding circuit having impedance characteristics that for a predetermined alternating current voltage impressed on the alternating current winding circuit from said source there is substantially no current flow therein until the flow of current in the direct current control winding reaches a predetermined value after which a rapid increase in the flow of current in the alternating current winding circuit is effected to supply said limiting means.

3. In a regulating system for a synchronous condenser connected to a load circuit, the combination comprising, a saturable core reactor having a direct current control winding disposed thereon, means for supplying unidirectional current to the direct current control winding in accordance with the flow of current in the load conductors, an adjustable resistor connected in parallel circuit relation with the direct current control winding disposed for operation to adjust the degree of energization of the control winding, an alternating current winding circuit for the saturable core reactor connected to be supplied from a source of alternating current voltage, the alternating current winding circuit including alternating current windings for the reactor and a series connected saturating reactor and capacitor and dry-type rectifier, and means connected to be supplied by the rectifier of the alternating current winding circuit disposed to limit the excitation of the synchronous condenser to maintain the flow of current in the load circuit below a predetermined value, the alternating current winding circuit having impedance characteristics that for a given alternating current voltage impressed on the alternating current winding circuit from said source there is substantially no current flow therein until the flow of current in the direct current control winding reaches a predetermined value after which a rapid increase in the flow of current in the alternating current winding circuit is effected to supply said limiting means.

4. In a regulating system for a synchronous condenser connected to a load circuit, the combination comprising, a regulating exciter generator disposed for operation to control the excitation of the synchronous condenser, a pair of control field windings for the regulating generator, a regulator responsive to an electrical condition of load circuit for directionally controlling the energization of one of the control field windings, and means responsive to a predetermined flow of current in the load conductors for energizing the other control field winding in a predetermined direction, said energizing means comprising a saturable core reactor having a direct current control winding disposed to be energized in accordance with the flow of current in the load conductors, and an alternating current winding circuit for the saturable reactor including a series connected saturating reactor, capacitor and dry-type rectifier, the rectifier being connected to the other control field winding to supply unidirectional current thereto, the alternating current winding circuit having impedance characteristics that for a predetermined alternating current voltage impressed thereon there is substantially no flow of current in the alternating current winding circuit as the flow of current in the direct current control winding increases to a predetermined value and when the flow of current in the direct current control winding increases beyond the predetermined value the flow of current in the alternating current winding circuit increases rapidly to effect a fast energization of the other control field winding to control the operation of the regulating exciter generator to limit the excitation of the synchronous condenser independently of the operation of the regulator.

5. In a regulating system for a synchronous condenser connected to a load circuit, the combination comprising, an exciter for controlling the field excitation of the synchronous condenser, a main control field winding for the exciter disposed to be directionally energized to control the excitation of the exciter, means responsive to a change in condition of the load circuit disposed for operation to control the directional energization of the main control field winding, an auxiliary control field winding disposed to be energized in one direction only in opposition to a predetermined directional energization of the main control field winding, and means responsive to a predetermined flow of current in the load conductors for effecting a rapid energization of the auxiliary control field winding, said energizing means comprising a saturable reactor having a direct current control winding disposed to be energized in accordance with the flow of current in the load conductors, and an alternating current winding circuit for the saturable reactor including a source of alternating current voltage, a series connected saturating reactor, capacitor and dry-type rectifier, the rectifier being connected to the auxiliary control field winding to supply unidirectional current thereto, the alternating current winding circuit having impedance characteristics that for a predetermined alternating current voltage impressed thereon from said source there is substantially no current flow therein until the flow of current in the direct current control winding reaches a predetermined value after which a rapid increase in the flow of current in the alternating current winding circuit is obtained to effect a fast energization of the auxiliary control field winding to control the operation of the exciter to limit the excitation of the synchronous condenser independently of the operation of the means responsive to the condition of the load circuit.

6. In a regulating system for a synchronous condenser connected to a load circuit, the combination comprising, an exciter for controlling the field excitation of the synchronous condenser, a main control field winding for the exciter disposed to be directionally energized to control the excitation of the exciter, means responsive to a change in condition of the load circuit disposed for operation to control the directional energization of the main control field winding, an auxiliary control field winding disposed to be energized in one direction only in opposition to a predetermined directional energization of the main control field winding, and means responsive to a predetermined flow of current in the load conductors for effecting a rapid energization of the auxiliary control field winding, said energizing means comprising a saturable reactor having a direct current control winding disposed thereon, means for supplying unidirectional current to the direct current control winding in accordance with the flow of current in the load conductors, means connected in circuit relation with the direct current control winding for adjusting the degree of energization thereof, and an alternating current winding circuit for the saturable reactor including a source of alternating current voltage, a series connected saturating reactor, capacitor and dry-type rectifier, the rectifier being connected to the auxiliary control field winding to supply unidirectional current thereto, the alternating current winding circuit having impedance characteristics that for a predetermined alternating current voltage impressed thereon from said source there is substantially no current flow therein until the flow of current in the direct current control winding reaches a predetermined value after which a rapid increase in the flow of current in the alternating current winding circuit is obtained to effect a fast energization of the auxiliary control field winding to control the operation of the exciter to limit the excitation of the synchronous condenser independently of the operation of the means responsive to the condition of the load circuit.

SCHUYLER L. BRADLEY.

No references cited.